United States Patent
Jacobs et al.

(10) Patent No.: US 7,493,486 B1
(45) Date of Patent: Feb. 17, 2009

(54) METHOD AND APPARATUS FOR SUPPORTING CRYPTOGRAPHIC-RELATED ACTIVITIES IN A PUBLIC KEY INFRASTRUCTURE

(75) Inventors: Stuart J. Jacobs, Hudson, MA (US); Francis Leo Mannix, Jr., Newton, MA (US); Thomas William Christoffel, Concord, MA (US); Scott Andrew Belgard, Randolph, MA (US)

(73) Assignee: Verizon Laboratories, Inc., Waltham, MA (US)

( * ) Notice: Subject to any disclaimer, the term of this patent is extended or adjusted under 35 U.S.C. 154(b) by 1064 days.

(21) Appl. No.: 09/591,708

(22) Filed: Jun. 9, 2000

(51) Int. Cl.
*H04L 9/00* (2006.01)
(52) U.S. Cl. .................. 713/153; 726/16; 380/30
(58) Field of Classification Search ......... 713/155–160, 713/170, 175–178, 152–153, 165, 173, 200–201; 380/1, 229, 232, 37, 54, 100, 132; 705/57–59; 382/100, 232, 132, 1, 37, 54, 229; 726/2, 726/16, 30; 711/216
See application file for complete search history.

(56) References Cited

U.S. PATENT DOCUMENTS

| | | | | |
|---|---|---|---|---|
| 4,780,995 A * | 11/1988 | Gittins | ........................... | 52/60 |
| 5,596,718 A * | 1/1997 | Boebert et al. | ................. | 726/16 |
| 5,606,617 A * | 2/1997 | Brands | ........................ | 380/30 |
| 5,668,998 A * | 9/1997 | Mason et al. | ................ | 717/104 |
| 5,703,562 A * | 12/1997 | Nilsen | .................. | 340/286.02 |
| 5,724,425 A * | 3/1998 | Chang et al. | ................... | 705/52 |
| 5,822,434 A * | 10/1998 | Caronni et al. | ............... | 713/156 |
| 5,822,435 A * | 10/1998 | Boebert et al. | ............... | 713/192 |
| 5,825,880 A * | 10/1998 | Sudia et al. | .................. | 713/180 |
| 5,825,890 A * | 10/1998 | Elgamal et al. | ............. | 713/151 |
| 5,845,280 A * | 12/1998 | Treadwell et al. | ............... | 707/8 |
| 5,850,449 A * | 12/1998 | McManis | ..................... | 713/161 |
| 5,937,066 A * | 8/1999 | Gennaro et al. | ............. | 380/286 |
| 5,983,350 A * | 11/1999 | Minear et al. | .................. | 726/11 |
| 5,991,399 A * | 11/1999 | Graunke et al. | ............. | 380/279 |
| 6,006,328 A * | 12/1999 | Drake | .......................... | 726/23 |
| 6,065,037 A * | 5/2000 | Hitz et al. | ................... | 709/200 |
| 6,085,178 A * | 7/2000 | Bigus et al. | .................... | 705/80 |
| 6,092,202 A * | 7/2000 | Veil et al. | ...................... | 726/27 |
| 6,157,919 A * | 12/2000 | Cordery et al. | ............... | 705/60 |
| 6,212,636 B1 * | 4/2001 | Boyle et al. | .................. | 713/168 |
| 6,226,742 B1 * | 5/2001 | Jakubowski et al. | ......... | 713/170 |
| 6,233,617 B1 * | 5/2001 | Rothwein et al. | ............ | 709/227 |
| 6,300,946 B1 * | 10/2001 | Lincke et al. | ................ | 715/700 |
| 6,311,273 B1 * | 10/2001 | Helbig et al. | ................... | 726/2 |
| 6,314,468 B1 * | 11/2001 | Murphy et al. | .............. | 709/236 |
| 6,314,521 B1 * | 11/2001 | Debry | ......................... | 713/201 |
| 6,363,477 B1 * | 3/2002 | Fletcher et al. | ............. | 713/151 |
| 6,367,012 B1 * | 4/2002 | Atkinson et al. | ............ | 713/176 |
| 6,374,402 B1 * | 4/2002 | Schmeidler et al. | ......... | 717/167 |
| 6,378,072 B1 * | 4/2002 | Collins et al. | ............... | 713/187 |
| 6,385,318 B1 * | 5/2002 | Oishi | ......................... | 380/262 |
| 6,401,206 B1 * | 6/2002 | Khan et al. | .................. | 713/176 |
| 6,405,316 B1 * | 6/2002 | Krishnan et al. | ............ | 713/190 |

(Continued)

*Primary Examiner*—KimYen Vu
*Assistant Examiner*—Leynna T Truvan

(57) ABSTRACT

In a node (110) communicating with other nodes in a network (150), a system and method for performing cryptographic-related functions is provided. The node (110) receives and transmits inputs and outputs requiring cryptographic-related processing. When cryptographic processing is required, the node (110) transmits a predefined message to a cryptographic processing component in the node (110) that then performs the desired cryptographic-related processing.

20 Claims, 5 Drawing Sheets

U.S. PATENT DOCUMENTS

| | | | |
|---|---|---|---|
| 6,405,364 B1 * | 6/2002 | Bowman-Amuah | 717/101 |
| 6,412,035 B1 * | 6/2002 | Webber | 710/261 |
| 6,573,907 B1 * | 6/2003 | Madrane | 715/719 |
| 6,606,479 B2 * | 8/2003 | Cook et al. | 434/350 |
| 6,609,159 B1 * | 8/2003 | Dukach et al. | 719/331 |
| 6,685,778 B2 * | 2/2004 | Davis et al. | 118/684 |
| 6,711,264 B1 * | 3/2004 | Matsumoto et al. | 380/283 |
| 6,839,759 B2 * | 1/2005 | Larson et al. | 709/228 |
| 7,000,106 B2 * | 2/2006 | Carter | 713/164 |
| 7,013,469 B2 * | 3/2006 | Smith et al. | 719/328 |
| 7,025,209 B2 * | 4/2006 | Hawkins | 209/217 |
| 7,080,044 B1 * | 7/2006 | Cordery et al. | 705/60 |
| 7,080,097 B2 * | 7/2006 | Wu | 707/104.1 |
| 7,167,844 B1 * | 1/2007 | Leong et al. | 705/80 |

* cited by examiner

METHOD AND APPARATUS FOR SUPPORTING CRYPTOGRAPHIC-RELATED ACTIVITIES IN A PUBLIC KEY INFRASTRUCTURE

GOVERNMENT CONTRACT

The U.S. Government has a paid-up license in this invention and the right in limited circumstances to require the patent owner to license others on reasonable terms as provided for by the terms of Contract No. DAAL01-96-2-002 awarded by the U.S. Army.

FIELD OF THE INVENTION

The present invention relates generally to cryptography and, more particularly, to systems and methods for supporting cryptographic-related activities in a public key infrastructure.

BACKGROUND OF THE INVENTION

Public key cryptography has been commonly used to provide a mechanism to support access control and general authentication services in distributed environments. For example, in networks storing confidential information, conventional systems typically employ access control to limit access to the confidential information to designated parties. These systems may additionally employ general authentication services to authenticate users of various network resources to ensure that originators and recipients of messages are actually the parties they claim to be.

Conventional public key cryptography relies upon public key certificates, such as those defined in ITU X.509, to bind a user's public key reliably to his name and provide users with the high level of assurance desired when identifying other entities. A certificate may be signed using a private key associated with the sender. The recipient of the message can then verify that the message was actually sent by the originator named in the message, provided that the recipient verifies the signature using the sender's public key.

In conventional systems, the responsibility for generating digital signatures and verifying digital signatures is borne by an application program executing on a general-purpose computer, under the control of a general-purpose operating system. For example, a conventional application program running on a computer in a network may have to authenticate link and network control messages. Similarly, the application program may have to encrypt messages using various encryption algorithms before transmitting these messages to other nodes in the network. Such tasks require an application programmer or network developer to acquire detailed knowledge of complex secret and public key algorithms and then develop programs to perform the required cryptographic functions.

Additionally, these cryptographic-related functions may require a network entity to exchange a number of messages with corresponding network entities when establishing a security association (SA). Such exchanges of messages consume very large amounts of network bandwidth, which is often limited in wireless systems.

As a result, there exists a need for a mechanism designed to avoid the requirement for an applications or network developer from having to acquire detailed knowledge of secret and public key algorithms. There is also a need for a mechanism that integrates cryptographic-related functions into a simple to use service set, thereby simplifying the developer's task regarding inclusion of strong security features in application and infrastructure programs.

SUMMARY OF THE INVENTION

Systems and methods consistent with the present invention address these and other needs by integrating cryptographic-related functions in a software-based tool. The software-based tool includes a standardized interface that may be used by program developers for requesting the desired functions. The tool may also be customized to include any cryptographic-related functions based on the requirements of the particular user/system.

In accordance with the purpose of the invention as embodied and broadly described herein, a method for performing cryptographic-related functions in a network node is provided. The method includes receiving an input requiring cryptographic-related processing and generating a message based on the input. The message represents one of a predefined set of messages for processing by a cryptographic processing component. The method also includes transmitting the message to the cryptographic processing component and performing the cryptographic-related processing.

In another aspect of the present invention, a computer-readable medium, having sequences of instructions stored thereon is provided. The instructions may be invoked by a plurality of predefined messages and include sequences of instructions which, when executed by a processor, cause the processor to receive an input representing one of the predefined messages. The instructions also cause the processor to transmit, based on the input, a request for cryptographic-related processing to a cryptographic processing module. The instructions further cause the processor to perform the cryptographic-related processing.

In still another aspect of the present invention, a cryptographic module is provided. The cryptographic module includes a memory configured to store a plurality of cryptographic processing programs where each program is invoked via one of a plurality of predefined messages. The cryptographic module also includes a processor configured to receive an input requiring cryptographic-related processing, generate one of the predefined messages based on the input, and transmit the message to a first one of the cryptographic processing programs. The processor is also configured to perform the cryptographic-related processing.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide cryptographic-related functions in a software-based tool that may be used by an applications or network developer. The developer requests a particular function using a predefined set of messages transmitted to the software-based tool via a function call. The software-based tool then performs the desired cryptographic-related function.

Exemplary System Configuration

Figure 1:
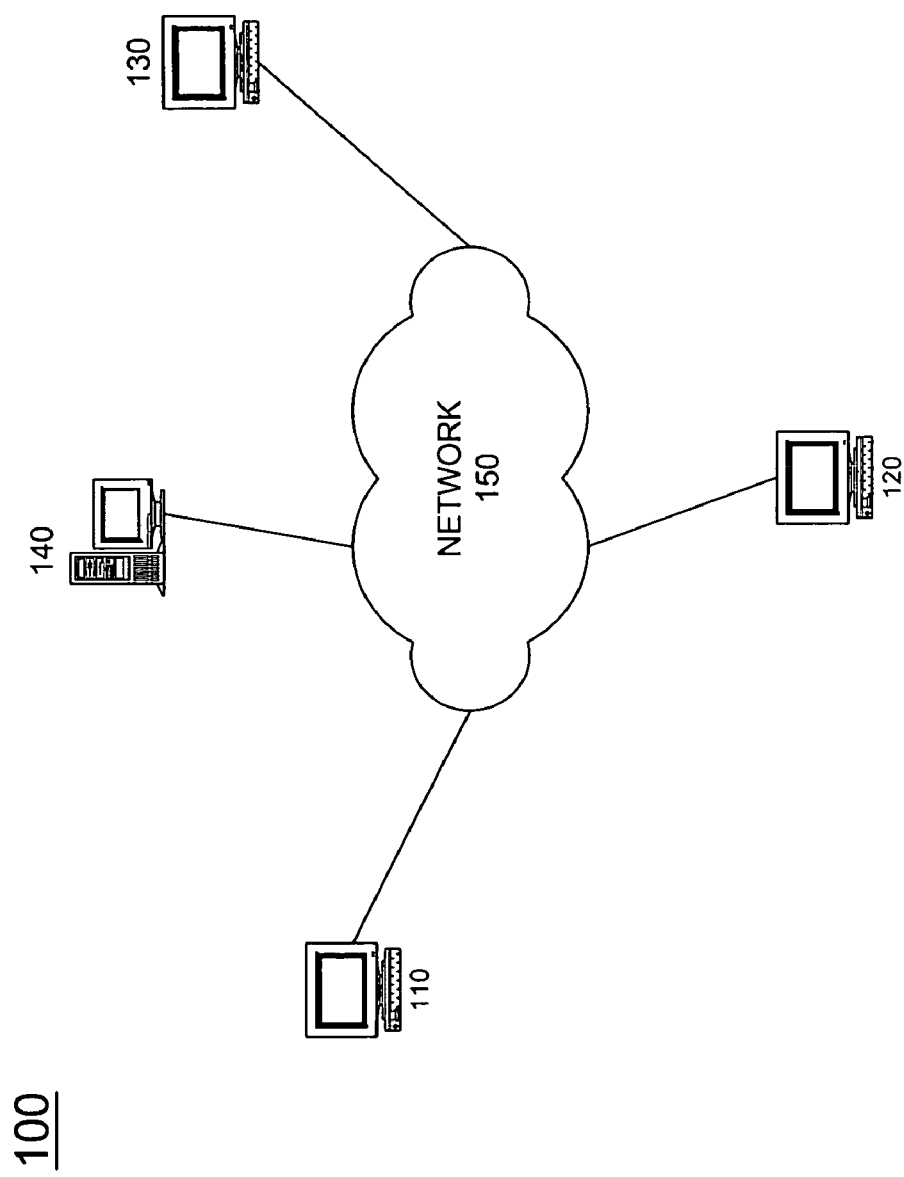
FIG. 1 is a block diagram of an exemplary system in which an implementation consistent with the present invention may be employed.

FIG. 1 is a diagram of an exemplary system 100 in which implementations of the present invention may be employed. The system 100 includes nodes 110, 120 and 130, server 140 and network 150.

Each of the nodes 110, 120 and 130 may include any type of computer device, such as a personal computer, a laptop, a personal digital assistant (PDA) or a similar device, with a connection to network 150. In an exemplary implementation of the present invention, the nodes 110-130 transmit/receive messages to/from other nodes over network 150 via wired, wireless, or optical connections. The network 150 may include the Internet, a local area network (LAN), wide area network (WAN), intranet or another type of network. Only three nodes are shown for simplicity. It should be understood, however, that any number of nodes may be included in system 100.

The server 140 may store certificates, public key information or other information required to verify/encrypt messages. For example, the server 140 may be a conventional lightweight directory access protocol (LDAP) server, an X.500 server or another type of server that stores certificates, certificate revocation lists (CRLs), or similar information. The nodes 110-130 may access the server 140 to retrieve various information needed to perform the authentication/verification functions, as described in more detail below.

Exemplary Node

Figure 2:
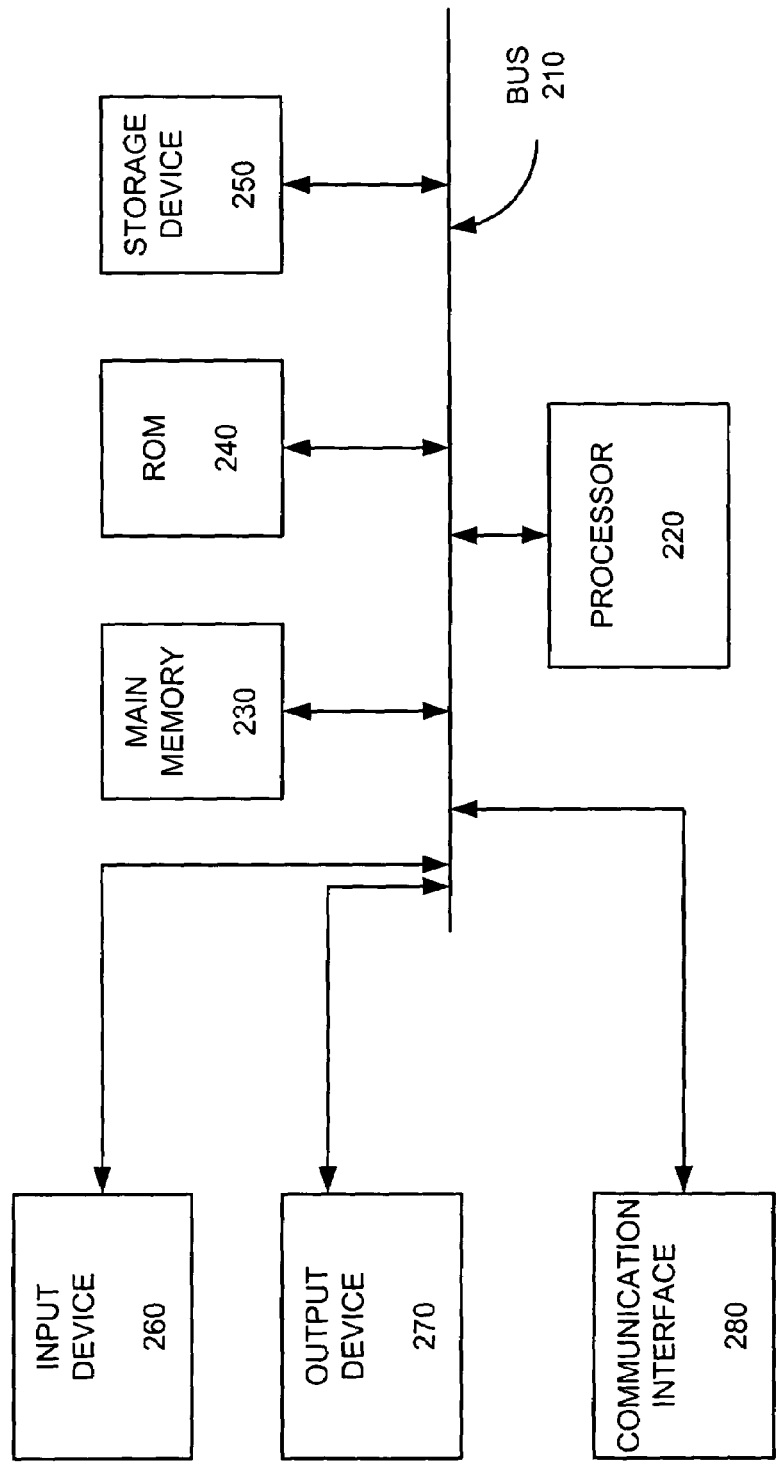
FIG. 2 is an exemplary block diagram of a node of FIG. 1 in which systems and methods consistent with the present invention may be employed.

FIG. 2 illustrates an exemplary node 110 of FIG. 1 in which methods and systems consistent with the present invention may be implemented. Node 110 includes a bus 210, a processor 220, a main memory 230, a read only memory (ROM) 240, a storage device 250, an input device 260, an output device 270, and a communication interface 280. The bus 210 permits communication among the components of the node 110.

The processor 220 may include any type of conventional processor or microprocessor that interprets and executes instructions. Main memory 230 may be a random access memory (RAM) or another type of dynamic storage device that stores information and instructions for execution by processor 220. Main memory 230 may also store temporary variables or other intermediate information used during execution of instructions by processor 220. The ROM 240 may include a conventional ROM device or another type of static storage device that stores static information and instructions for processor 220. The storage device 250 may include any type of magnetic or optical recording medium and its corresponding drive, such as a magnetic disk or optical disk and its corresponding disk drive.

The input device 260 may include any conventional mechanism that permits an operator to input information to the node 110, such a keyboard, a mouse, a pen, voice recognition and/or biometric mechanisms, etc. The output device 270 may include any conventional mechanism that outputs information to the operator, including a display, a printer, a pair of speakers, etc. The communication interface 280 may include any transceiver-like mechanism that enables the node 110 to communicate with other devices and/or systems. For example, the communication interface 280 may include a modem or an Ethernet interface for communicating via a LAN. Alternatively, the communication interface 280 may include other mechanisms for communicating via a network, such as network 150.

Node 110, consistent with the present invention, performs cryptographic-related functions in response to processor 220 executing sequences of instructions contained in a computer readable medium, such as memory 230. A computer-readable medium may include one or more memory devices and/or carrier waves. Such instructions may be read into memory 230 from another computer-readable medium, such as a data storage device 250, or from a separate device via communication interface 280. Execution of the sequences of instructions contained in memory 230 causes processor 220 to perform the process steps that will be described hereafter. In alternative embodiments, hard-wired circuitry may be used in place of or in combination with software instructions to implement the present invention. Thus, the present invention is not limited to any specific combination of hardware circuitry and software.

Exemplary Node Components

Figure 3:
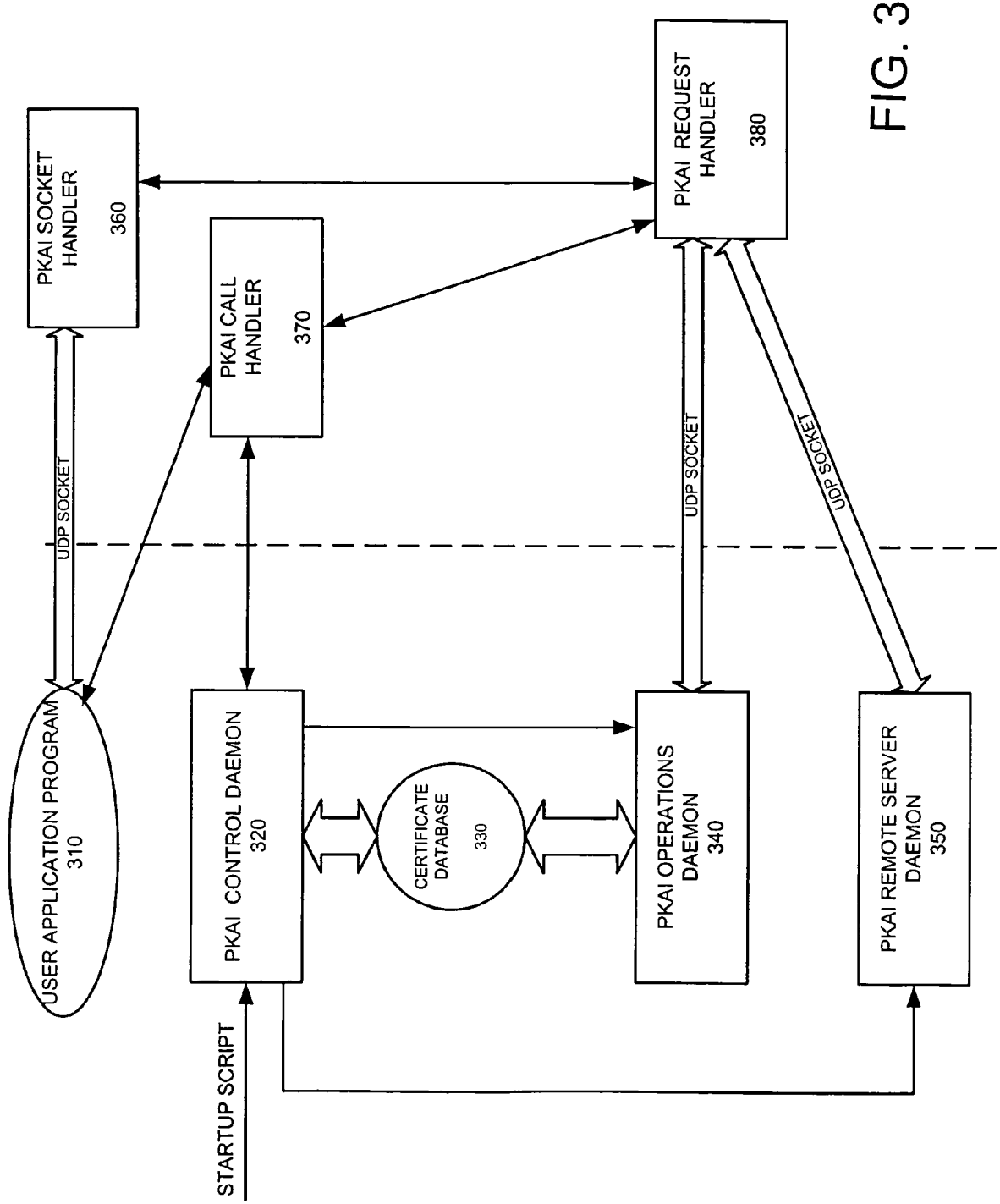
FIG. 3 illustrates user space components and kernel space components consistent with an implementation of the present invention.

FIG. 3 schematically illustrates the user space components and kernel space components in node 110, in an exemplary implementation consistent with the present invention. In the exemplary implementation, the user space components may reside in any one of or a combination of main memory 230, ROM 240 and storage device 250. In addition, the kernel space components may reside in any one of or a combination of main memory 230, ROM 240 and storage device 250. Additionally, both the user space components and kernel space components may interact with the other devices in node 110, such as processor 220.

The user space components and kernel space components are shown separated by a dotted line in FIG. 3. The user space components include user application program 310, public key authentication infrastructure (PKAI) control daemon 320, certificate database 330, PKAI operations daemon 340 and PKAI remote server daemon 350. The kernel space components include PKAI socket handler 360, PKAI call handler 370 and PKAI request handler 380.

The PKAI control daemon 320 initializes and shuts down PKAI services. A startup script may invoke the PKAI control daemon 320 with "start" and an optional pass phrase. The PKAI control daemon 320 may initialize the PKAI operations daemon 340 and the PKAI remote server daemon 350. In addition, the PKAI control daemon 320 shuts down the PKAI operations and remote server daemons 340 and 350 when the PKAI shuts down, such as when power to the node 110 is terminated.

The PKAI operations daemon 340 may communicate with PKAI request handler 380 via a user datagram protocol (UDP) socket. The PKAI operations daemon 340 performs local disk input/output on behalf of PKAI request handler 380. For example, the PKAI request handler 380 may use PKAI operations daemon 340 to store X.509 certificates to memory and retrieve X.509 digital certificates from memory, such as certificates database 330.

The PKAI remote server daemon 350 may also communicate with PKAI request handler via a UDP socket. The PKAI remote server daemon 350 retrieves information on behalf of PKAI request handler 380. For example, the PKAI remote server daemon 350 may retrieve X.509 digital certificates and certificate revocation lists (CRLs) from a network accessible server, such as server 140 (FIG. 1). The PKAI remote server daemon 350 may store these certificates and CRLs in certificate database 330.

The PKAI system socket handler 360 may communicate with user application program 310 over a UDP socket. For example, the communication may include a request for cryptographic-related services, as discussed in more detail below. In this situation, the PKAI socket handler 360 generates a corresponding function call to the PKAI request handler 380 to perform the desired function. The PKAI call handler 370 may also receive system service calls from user application program 310 and PKAI control daemon 320. The PKAI call handler 370 then generates a corresponding function call to the PKAI request handler 380, based on the particular request.

Figure 4:
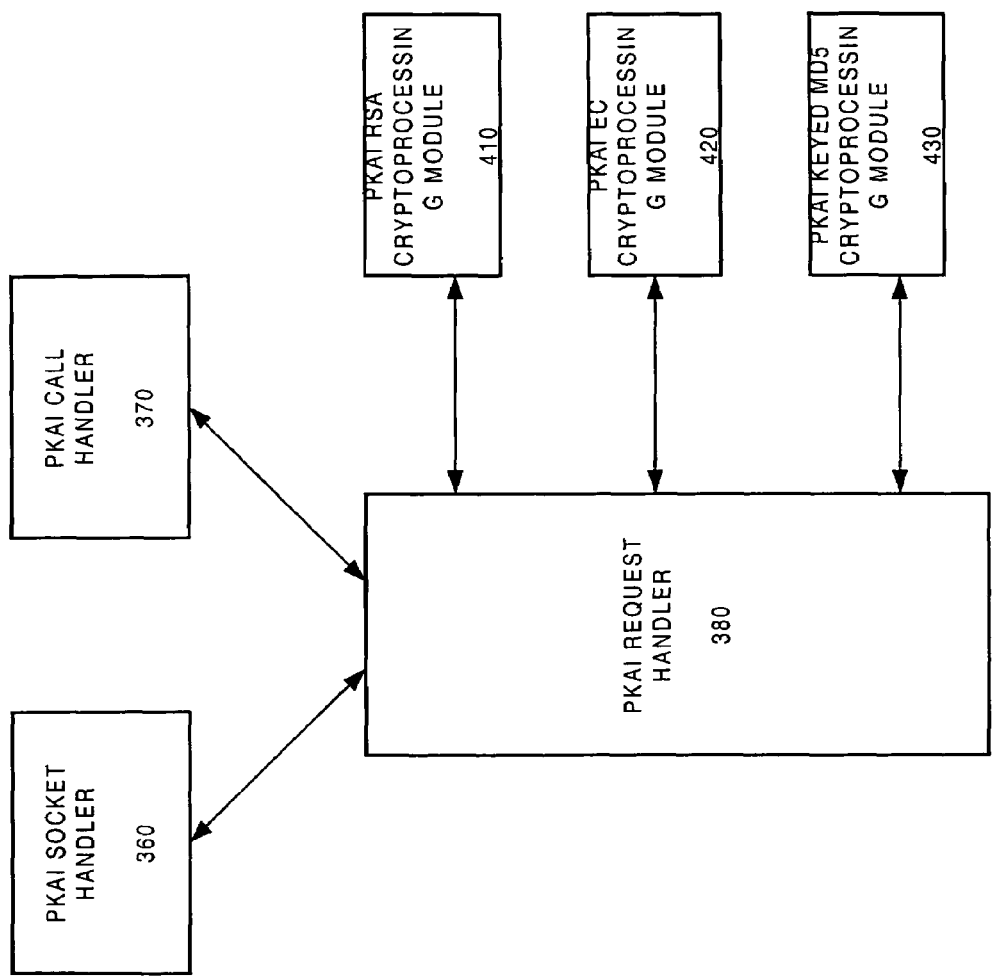
FIG. 4 is an exemplary diagram of kernel space components consistent with an implementation of the present invention.

FIG. 4 illustrates the PKAI components of FIG. 3 residing in the kernel space along with three cryptographic processing components, consistent with an exemplary implementation of the present invention. In an exemplary implementation, the cryptographic processing components are compiled into the kernel during a kernel re-build and their functionality invoked via a system service function call.

The kernel components illustrated in FIG. 4 include PKAI socket handler 360, PKAI call handler 370, PKAI request handler 380, PKAI RSA cryptoprocessing module 410, PKAI elliptic curve (EC) cryptoprocessing module 420 and PKAI keyed message digest algorithm 5 (MD5) cryptoprocessing module 430. Only three cryptoprocessing modules are shown for simplicity. Other cryptoprocessing modules may be included in the kernel space based on the particular user/system requirements. Additionally, the details of the particular cryptoprocessing modules used in implementations of the present invention, such as modules 410-430, would be obvious to one of ordinary skill in this art and are not described herein.

Referring back to FIG. 3, a system service function call may be initiated by user application program 310 via the UDP socket to PKAI socket handler 360 or by a system service call directly to the PKAI call handler 370. The system service function call may also be initiated by PKAI control daemon 320 to PKAI call handler 370. Other methods of invoking the PKAI functions may also be used in alternative implementations. For example, the PKAI cryptographic-related functions may be invoked by any number of conventional call mechanisms based on the particular user/system requirements. In each case, the network or applications programmer need only be aware of the particular set of predefined messages needed to invoke the desired function. These messages are then incorporated into the user application program 310 as required.

As described above, the PKAI request handler 380 may receive requests for cryptographic-related services from a number of sources. In each situation, the PKAI request handler 380 receives the request and generates a function call to the appropriate cryptoprocessing module, such as one of cryptoprocessing modules 410-430. The details of performing the particular cryptographic-related functions are described in more detail below.

Exemplary Processing for Providing Crytpographic-Related Functions

Figure 5:
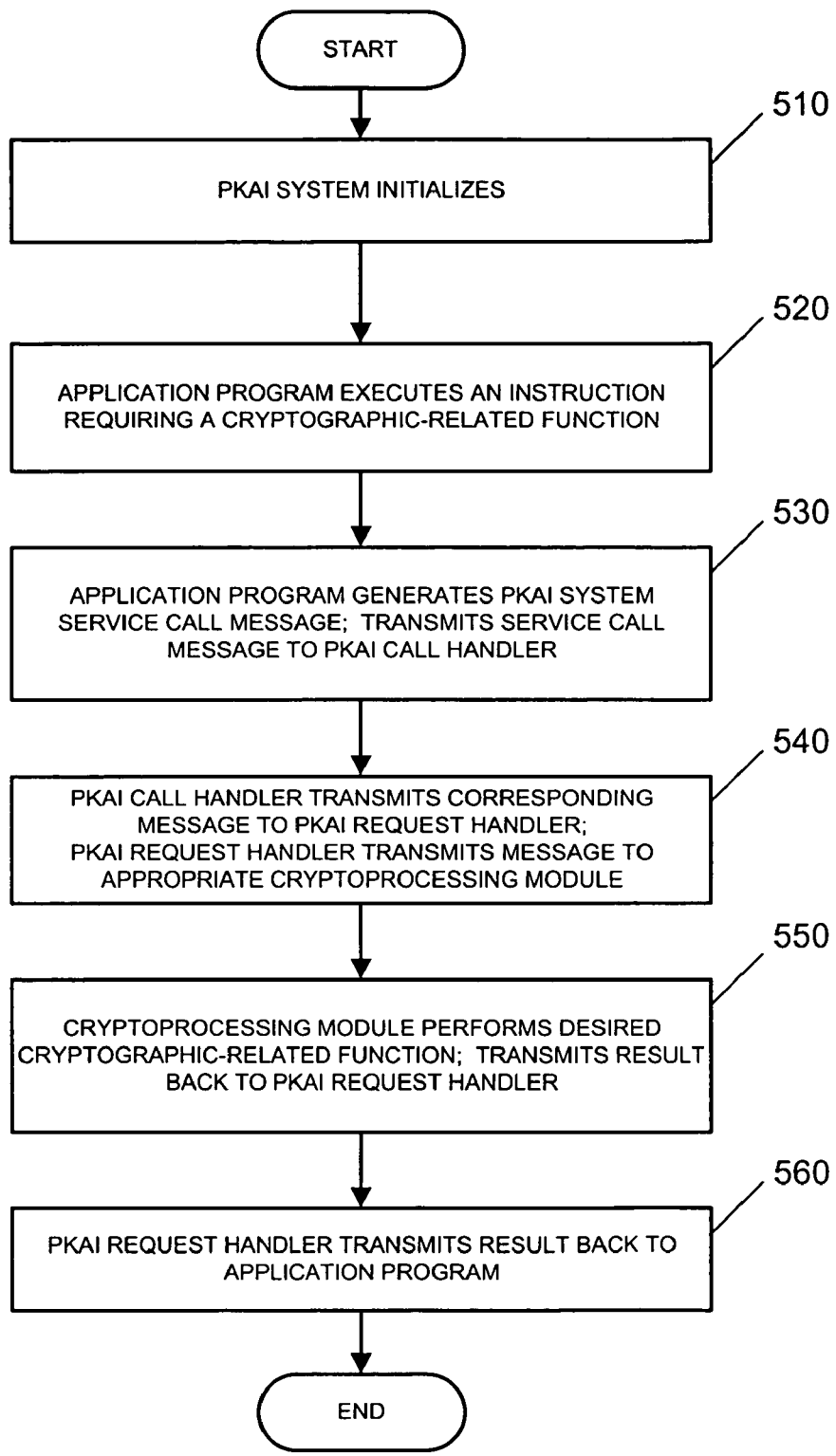
FIG. 5 is a flowchart of processing for providing cryptographic-related functions in a manner consistent with the present invention.

FIG. 5 illustrates processing associated with performing cryptographic-related functions using the PKAI system. Processing begins with initialization of the PKAI system (step 510). The PKAI system may be initialized by a startup script that is executed after node 110 is powered up. After the PKAI system begins operating, the control daemon, operations daemon and remote server daemons 320, 340 and 350, respectively, operate as described with regard to FIGS. 3 and 4.

Assume that the user application program 310 executes an instruction requiring cryptographic-related processing (step 520). Such an instruction may, for example, require verifying a digital signature transmitted with a certificate using an RSA, MD5, EC or digital signature standard (DSS) algorithm or generating an RSA, MD5, EC or DSS digital signature. The instruction may also require encrypting or decrypting data using an RSA, EC or other cryptographic algorithm. The instruction may further require retrieving a digital certificate or certificate revocation list from either the user space components or a remote server, such as server 140. The instruction may also include verifying a certificate's hierarchy, performing self-signed certificate processing, performing certificate age checking, or retrieving, verifying and storing a digital certificate in the node. In essence, the instruction may require performing any cryptographic-related function, based on the system requirements.

The user application program 310, after executing the instruction, generates a system service call to PKAI call handler 370 (step 530). The system service call, consistent with the present invention, may be chosen from a predefined list of messages that are used to invoke PKAI services. For example, assume that the request is for verifying an RSA 512 bit digital signature transmitted with a certificate. In this case, the predefined message may be PKAI_RSA512ver. In this scenario, the user application program 310 may then transmit PKAI_RSA512ver to the PKAI call handler 370. The PKAI call handler 370 receives the request and forwards a corresponding function call to the PKAI request handler 380 (step 540).

In the example, the PKAI call handler 370 may transmit PKAI_RSA52ver_req to the PKAI request handler 380. The PKAI request handler 380 may then transmit the request message to the appropriate cryptoprocessing module for processing (step 540). In this example, the PKAI request handler 380 transmits PKA_RSA512ver_req to PKAI RSA cryptoprocessing module 410 (FIG. 4). The PKAI RSA cryptoprocessing module 410 then performs the desired function, i.e., verifies the status of the RSA 512 bit digital signature transmitted with the certificate (step 550). The PKAI RSA cryptoprocessing module 410 then transmits the result to the PKAI request handler 380 (step 550). After receiving the result, the PKAI request handler 380 forwards the result back to the user application program 310 that initiated the request (step 560). The result may optionally be transmitted to the user application program 310 via the PKAI call handler 370.

Systems and methods consistent with the present invention enable applications and network programmers to incorporate any required cryptographic-related processing by merely incorporating the desired call message. An advantage of the invention is that the applications or network programmer is able to incorporate complex security features without having to gain detailed knowledge of complex secret and public key algorithms. Appendix A illustrates an exemplary set of PKAI function call messages that may be used in an implementation consistent with the present invention. It should be understood that additional function call messages may be used in alternative implementations consistent with the present invention.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the PKAI system has been described as being resident in one of the network nodes that receives/transmits messages. In alternative implementations, the PKAI system may be located remotely from the network node. The scope of the invention is defined by the claims and their equivalents.

APPENDIX A

Each table provides the function name and a brief usage description.

TABLE 1

PKAI Certificate Specific kernel Functions

| Function Name | Function Usage |
| --- | --- |
| pkail_cert_check | Verify a certificate as having valid "not before" and "not after" dates, and that other certificate fields are correct. |
| pkail_cert_create | Create a certificate entry. calls pkail_cert_decompose, pkail_cert_sig_check, pkail_cert_check |
| pkail_cert_decompose | Decompose a certificate into it's individual fields and move these field values into pkail_cert_fields structure |
| pkail_cert_sig_check | Verify a certificate as having valid digital signature. Calls pkail_rsaverify |
| pkail_disk_getcert | Request pkail_oper daemon to retrieve a ASN.1 BER formatted cert from pkail disk located database |
| pkail_disk_putcert | Request pkail_oper daemon to store a ASN.1 BER formatted cert in pkail disk located database |
| pkail_fndcert | Locate and return ASN.1 BER formatted cert to requester. Calls pkail_disk_getcert |
| pkail_loadcert | Process new certificate received from user space for loading into pkail kernel storage and pkail disk database. Calls pkail_cert_create, pkail_disk_putcert |

TABLE 2

PKAI Secret Key Specific kernel Functions

| Function Name | Function Usage |
| --- | --- |
| pkail_keyedmd5sign | Generate a prefix-postfix keyed MD5 digital signature. Calls pkail_skey_get, pkail_md5 |
| pkail_keyedmd5ver | Verify a prefix-postfix keyed MD5 digital signature. Calls pkail_skey_get, pkail_md5 |
| pkail_md5 | Generate secret Prefix Postfix keyed MD5 message hash operation resulting in a secret key digital signature |
| pkail_setspi | Process a secret key entry for secret keys used with the keyed MD5 authentication. Calls pkail_skey_get, pkail_skey_create |
| pkail_skey_create | Create a secret key entry for secret keysin pkail_skey_list |
| pkail_skey_get | Locate a secret key entry by searching the pkail_skey_list for a match on pkail_skey_list.addr and pkail_skey_list.spi and when found return pkail_skey_list.key of pkail_skey_list.klen |

TABLE 3

PKAI RSA Specific kernel Functions

| Function Name | Function Usage |
| --- | --- |
| pkail_rsasign | Process request to generate an RSA digital signature. Calls pkail_privkey_get, pkail_rsa512sign, pkail_rsa768sign, pkail_rsa1024sign, pkail_rsa2048sign |
| pkail_rsa512sign | Generate an RSA 512 bit digital signature |
| pkail_rsa768sign | Generate an RSA 768 bit digital signature |
| pkail_rsa1024sign | Generate an RSA 1024 bit digital signature |
| pkail_rsa2048sign | Generate an RSA 2048 bit digital signature |
| pkail_rsaverify | Verify an RSA digital signature. Calls pkail_pubkey_get, pkail_rsa512ver, pkail_rsa768ver, pkail_rsa1024ver, pkail_rsa2048ver |
| pkail_rsa512ver | Verify an RSA 512 bit digital signature |
| pkail_rsa768ver | Verify an RSA 7688 bit digital signature |
| pkail_rsa1024ver | Verify an RSA 1024 bit digital signature |
| pkail_rsa2048ver | Verify an RSA 2048 bit digital signature |
| pkail_rsaencryp | Encrypt up to 4096 bytes of requester text. Calls pkail_privkey_get, pkail_rsa512encryp, pkail_rsa768encryp, pkail_rsa1024encryp, pkail_rsa2048encryp |
| pkail_rsa512encryp | Encrypt up to 4096 bytes of requester text using an RSA 512 bit public key |
| pkail_rsa768encryp | Encrypt up to 4096 bytes of requester text using an RSA 768 bit public key |
| pkail_rsa1024encryp | Encrypt up to 4096 bytes of requester text using an RSA 1024 bit public key |
| pkail_rsa2048encryp | Encrypt up to 4096 bytes of requester text using an RSA 2048 bit public key |
| pkail_rsadecryp | Decrypt up to 4096 bytes of requester text. Calls pkail_pubkey_get, pkail_rsa512decryp, pkail_rsa768decryp, pkail_rsa1024decryp, pkail_rsa2048decryp |
| pkail_rsa512decryp | Decrypt up to 4096 bytes of requester text using an RSA 512 bit private key |
| pkail_rsa768decryp | Decrypt up to 4096 bytes of requester text using an RSA 768 bit private key |
| pkail_rsa1024decryp | Decrypt up to 4096 bytes of requester text using an RSA 1024 bit private key |
| pkail_rsa2048decryp | Decrypt up to 4096 bytes of requester text using an RSA 2048 bit private key |

TABLE 4

PKAI EC Specific kernel Functions

| Function Name | Function Usage |
| --- | --- |
| pkail_ecsign | Process request to generate an EC digital signature. Calls pkail_privkey_get, pkail_ec80sign, pkail_ec120sign, pkail_ec1160sign |
| pkail_ec80sign | Generate an EC 80 bit digital signature |
| pkail_ec120sign | Generate an EC 120 bit digital signature |
| pkail_ec160sign | Generate an EC 160 bit digital signature |
| pkail_ecverify | Verify an EC digital signature. Calls pkail_pubkey_get, pkail_ec80ver, pkail_ec120ver, pkail_ec160ver |
| pkail_ec80ver | Verify an EC 80 bit digital signature |
| pkail_ec120ver | Verify an EC 120 bit digital signature |
| pkail_ec160ver | Verify an EC 160 bit digital signature |
| pkail_ecencryp | Encrypt up to 4096 bytes of requester text. Calls |

TABLE 4-continued

PKAI EC Specific kernel Functions

| Function Name | Function Usage |
|---|---|
| | pkail_privkey_get, pkail_ec80encryp, pkail_ec120encryp, pkail_ec160encryp |
| pkail_ec80encryp | Encrypt up to 4096 bytes of requester text using an EC 80 bit public key |
| pkail_ec120encryp | Encrypt up to 4096 bytes of requester text using an EC 120 bit public key |
| pkail_ec160encryp | Encrypt up to 4096 bytes of requester text using an EC 160 bit public key |
| pkail_ecdecryp | Decrypt up to 4096 bytes of requester text. Calls pkail_pubkey_get, pkail_ec80decryp, pkail_ec120decryp, pkail_ec160decryp |
| pkail_ec80decryp | Decrypt up to 4096 bytes of requester text using an EC 80 bit private key |
| pkail_ec120decryp | Decrypt up to 4096 bytes of requester text using an EC 120 bit private key |
| pkail_ec160decryp | Decrypt up to 4096 bytes of requester text using an EC 160 bit private key |

TABLE 5

PKAI DSS Specific kernel Functions

| Function Name | Function Usage |
|---|---|
| pkail_dsssign | Generate a DSS 512 bit digital signature |
| pkail_dssverify | Verify a DSS 512 bit digital signature |

TABLE 6

PKAI Common kernel Functions

| Function Name | Function Usage |
|---|---|
| pkail_cleartables | Clear out all pkail kernel tables by overwriting with zeros, de-allocating memory, close sockets from pkail kernel services to pkail daemons |
| pkail_core | Identify requested pkail kernel service and call required action functions |
| pkail_err | General pkail kernel services function for logging errors to sys log |
| pkail_opensockets | Open sockets from pkail kernel services to pkail daemons |
| pkail_pphrase | process part of passphrase received from user space |
| pkail_privkey_create | create a private key entry. Calls pkail_privkey_get |
| pkail_privkey_get | Locate a private key, search the pkail_privkey_list for a match on either pkail_privkey_list.my_ip_addr or pkail_privkey_list.my_host_name |
| pkail_pubkey_get | Locate a public key, search the pkail_cert_list for a match on either pkail_cert_list.subj_ip_addr or pkail_cert_list.subj_host_name and when found return pkail_cert_list.pubkey |
| sys_soc_pkail | Receive UDP socket service calls from user space clients of pkail kernel services |
| sys_pkail | Receive system service calls from user space clients of pkail kernel services. Calls verify_area and pkail_core |

What is claimed is:

1. In a node operative within a network of a plurality of nodes, a method for performing cryptographic-related functions, comprising:
   executing an application program in a user space at the node;
   receiving an input requiring cryptographic-related processing;
   generating a message in the node via the application program based on the input, the message being the same as one of a predefined set of messages stored in the node and being processed by one of a plurality of cryptographic processing components located in a kernel space within the node, each one of said messages being associated with a respective one of said cryptographic-related functions;
   transmitting the message to one of a socket handler and a call handler in kernel space at the node to obtain a transmitted message;
   forwarding the transmitted message to a request handler at the node which generates a function call to the cryptographic processing component appropriate for the transmitted message; and
   performing the cryptographic-related processing by the cryptographic processing component appropriate for the transmitted message.

2. The method of claim 1, wherein the cryptographic-related processing includes at least one of:
   verifying or generating a digital signature; encrypting data; decrypting data; retrieving a digital certificate or certificate revocation list; verifying a certificate's hierarchy; self-signed certificate processing; retrieving, verifying and storing a digital certificate in the node; or certificate age checking.

3. The method of claim 1, wherein the transmitting includes:
   generating a user datagram protocol (UDP) message containing an identifier associated with a predetermined cryptographic-related function and transmitting the UDP message via a UDP socket to the socket handler.

4. The method of claim 1, further comprising:
   generating an output message via the application program, the output message requiring cryptographic-related processing;
   transmitting, based on the required cryptographic-related processing, one of the predefined set of messages to the cryptographic processing component;
   performing the cryptographic-related processing; and
   outputting the processed message.

5. A computer-readable medium in a node operating within a network of nodes, the node including a processor, the medium having stored thereon a plurality of sequences of instructions that may be invoked by a plurality of predefined messages, said instructions including sequences of instructions which, when executed by the processor in a user space, cause said processor to perform a method comprising:
   receiving an input from the network representing one of the predefined messages;
   generating, within the node and based on the input, a function call representing a request for cryptographic-related processing, and transmitting within the node said function call to a cryptographic processing module; and
   performing the cryptographic-related processing in a kernel space;
   wherein at least the receiving, the transmitting and the performing are implemented by public key authentication infrastructure (PKAI) comprising:
   user space components including a user application program, a PKAI control daemon, a certificate database, a PKAI operations daemon and a PKAI remote server daemon; and
   kernel space components including a PKAI socket handler, a PKAI call handler and a PKAI request handler;
   wherein certain of the user space components communicate with other of the user space components and certain of the kernel space components communicate with other of the kernel space components; and wherein other certain of the user space components communicate with other certain of the kernel space components.

6. The computer-readable medium of claim 5, wherein the performing the cryptographic-related processing includes at least one of:

verifying or generating a digital signature; encrypting or decrypting data; retrieving a digital certificate or certificate revocation list; verifying a certificate's hierarchy; self-signed certificate processing; retrieving, verifying and storing a digital certificate; or certificate age checking.

7. The computer-readable medium of claim 5, wherein the input represents a digitally signed network control message requiring verification.

8. A cryptographic module in a node operative within a network of nodes, said module comprising:

a memory configured to store a plurality of cryptographic processing programs in user space on a computer-readable medium, each program being invoked via one of a plurality of predefined messages; and a processor configured to:

receive an input from the network requiring cryptographic-related processing, generate within the node one of the predefined messages based on the input, transmit within the node the message to the memory to invoke a first one of the cryptographic processing programs, and perform, in kernel space, the cryptographic-related processing;

wherein the module receives, generates, transmits and performs through infrastructure comprising:

user space components including a user application program, a control daemon, a certificate database, an operations daemon and a remote server daemon; and kernel space components including a socket handler, a call handler and a request handler;

wherein certain of the user space components communicate with other of the user space components and certain of the kernel space components communicate with other of the kernel space components; and wherein other certain of the user space components communicate with other certain of the kernel space components.

9. The cryptographic module of claim 8, wherein when performing the cryptographic-related processing, the processor is configured to perform at least one of:

verifying or generating a digital signature; encrypting data; decrypting data; retrieving a digital certificate or certificate revocation list; verifying a certificate's hierarchy; self-signed certificate processing; retrieving, verifying and storing a digital certificate; or certificate age checking.

10. The cryptographic module of claim 8, wherein when transmitting the message, the processor is further configured to:

transmit a function call to the first cryptographic processing program.

11. The cryptographic module of claim 8, wherein the processor is further configured to:

transmit the result of the cryptographic-related processing to an application program.

12. A method of performing cryptographic-related functions in a node coupled to other nodes in a network, the node including an application program executed in user space for handling communications with the other nodes, the method comprising:

receiving in said node from one of said other nodes an input requiring a cryptographic-related operation;

generating in said node a predefined message based on the input, the message representing one of a plurality of predefined messages usable by a cryptographic processing program executed by one of a plurality of cryptographic processing components in kernel space, each one of said messages being associated with a respective one of said cryptographic-related functions;

transmitting in said node the predefined message to a socket handler in kernel space or a call handler in kernel space to obtain a transmitted message;

forwarding the transmitted message to a request handler within the node which generates a function call to the cryptographic processing component appropriate for the transmitted message; and performing in said node, via the cryptographic processing program, the required cryptographic-related operation.

13. The method of claim 12, further comprising:

returning the result of the performing to the application program.

14. The method of claim 12, wherein the predefined message includes at least one of:

a request for digital signature generation, a request for digital signature verification, a request for data encryption, a request for data decryption, a request for retrieval of a digital certificate, a request for retrieval of a certificate revocation list, a request for verification of a certificate's hierarchy, a request for self-signed certificate processing, or a request for certificate age checking.

15. The method of claim 14, wherein the request for digital signature generation includes a request for at least one of RSA signature generation, secret keyed MD5 signature generation, elliptic curve signature generation or digital signature standard signature generation.

16. The method of claim 14, wherein the request for digital signature verification includes a request for at least one of RSA signature verification, secret keyed MD5 signature verification, elliptic curve signature verification or digital signature standard signature verification.

17. The method of claim 14, wherein the request for data encryption includes a request for at least one of RSA based encryption or elliptic curve based encryption.

18. The method of claim 14, wherein the request for data decryption includes a request for at least one of RSA based decryption or elliptic curve based decryption.

19. The method of claim 12, wherein the performing includes:

accessing a remote server via the network to retrieve cryptographic-related information.

20. In a node operating within a network, a computer-readable medium that stores instructions in user space executable in kernel space by at least one processor in the node to perform a method for providing cryptographic-related functions, the method comprising:

receiving, responsive to input to the node from another node in the network, in the at least one processor a first function call from a predefined list of function calls, the predefined list of function calls representing available cryptographic-related functions executable by the at least one processor;

generating in the at least one processor in the node a request message based on the first function call, the request message representing a request for processing by a cryptographic processing module;

transmitting in the node the request message to the cryptographic processing module; and performing in the at least one processor the cryptographic-related function;

wherein the receiving, the generating the transmitting and the performing are implemented by:

user space components including a user application program, a control daemon, a certificate database, a operations daemon and a remote server daemon; and kernel space components including a socket handler, a call handler and a request handler;

wherein certain of the user space components communicate with other of the user space components and certain of the kernel space components communicate with other of the kernel space components; and wherein other certain of the user space components communicate with other certain of the kernel space components.

* * * * *